(12) United States Patent  (10) Patent No.: US 7,930,514 B2
Hagspiel et al.  (45) Date of Patent: Apr. 19, 2011

(54) METHOD, SYSTEM, AND COMPUTER PROGRAM PRODUCT FOR IMPLEMENTING A DUAL-ADDRESSABLE CACHE

(75) Inventors: Norbert Hagspiel, Tuebingen (DE); Erwin Pfeffer, Holzgerlingen (DE); Bruce A. Wagar, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 379 days.

(21) Appl. No.: 11/054,298

(22) Filed: Feb. 9, 2005

(65) Prior Publication Data
US 2006/0179233 A1  Aug. 10, 2006

(51) Int. Cl.
*G06F 12/00* (2006.01)
(52) U.S. Cl. . 711/205; 711/118; 711/103; 711/E12.063; 711/128
(58) Field of Classification Search ............ 711/136, 711/207, 202, 118, E12.063
See application file for complete search history.

(56) References Cited

U.S. PATENT DOCUMENTS

| | | | | |
|---|---|---|---|---|
| 4,797,814 A | * | 1/1989 | Brenza | 711/3 |
| 5,073,851 A | * | 12/1991 | Masterson et al. | 711/140 |
| 5,584,002 A | * | 12/1996 | Emma et al. | 711/3 |
| 5,668,968 A | * | 9/1997 | Wu | 711/3 |
| 6,772,315 B1 | * | 8/2004 | Perego | 711/207 |
| 2003/0159003 A1 | * | 8/2003 | Gaskins et al. | 711/128 |
| 2005/0055528 A1 | * | 3/2005 | Arimilli et al. | 711/203 |

* cited by examiner

*Primary Examiner* — Reginald G Bragdon
*Assistant Examiner* — Victor W Wang
(74) *Attorney, Agent, or Firm* — Cantor Colburn LLP; John Campbell

(57) ABSTRACT

A method, system, and computer program product for implementing a dual-addressable cache is provided. The method includes adding fields for indirect indices to each congruence class provided in a cache directory. The cache directory is indexed by primary addresses. In response to a request for a primary address based upon a known secondary address corresponding to the primary address, the method also includes generating an index for the secondary address, and inserting or updating one of the indirect indices into one of the fields for a congruence class relating to the secondary address. The indirect index is assigned a value of a virtual index corresponding to the primary address. The method further includes searching congruence classes of each of the indirect indices for the secondary address.

20 Claims, 5 Drawing Sheets

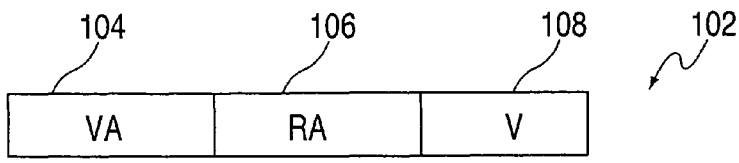
FIG. 1A
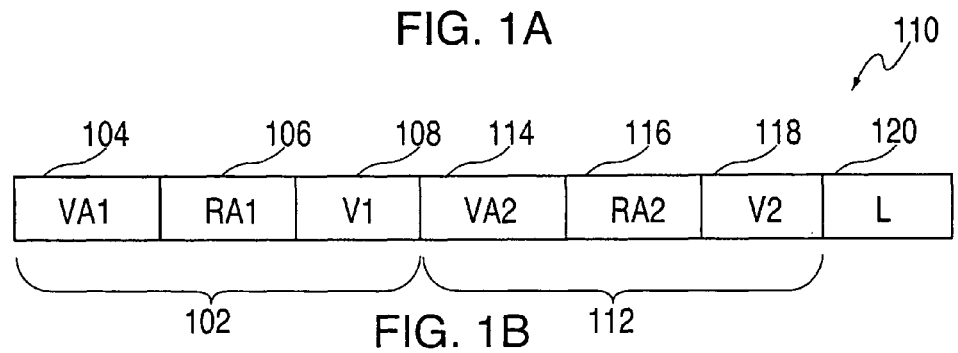
FIG. 1B
FIG. 1C
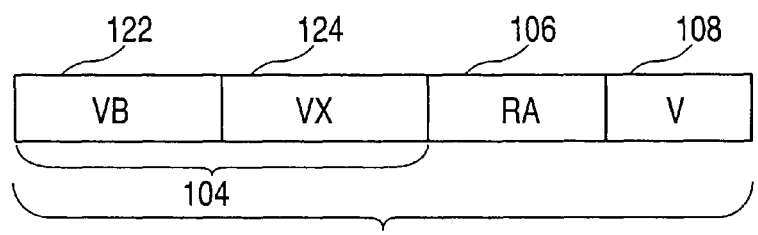
| 102 | 112 | 120 |
|---|---|---|
| CC0 ENTRY 1 | CC0 ENTRY 2 | L0 |
| CC1 ENTRY 1 | CC1 ENTRY 2 | L1 |
| CC2 ENTRY 1 | CC2 ENTRY 2 | L2 |
| ⋮ | ⋮ | ⋮ |
| CC C-1 ENTRY 1 | CC C-1 ENTRY 2 | L C-1 |
FIG. 1D

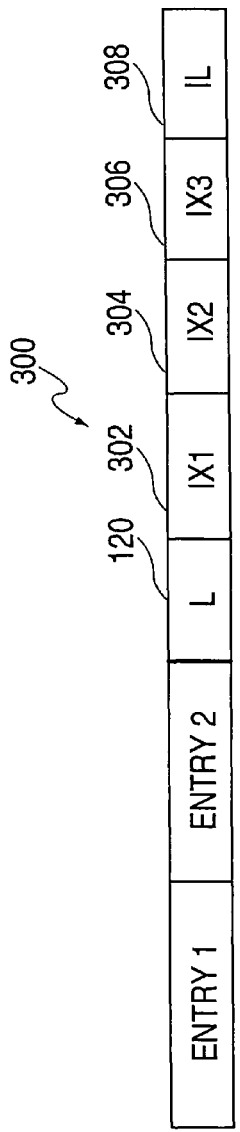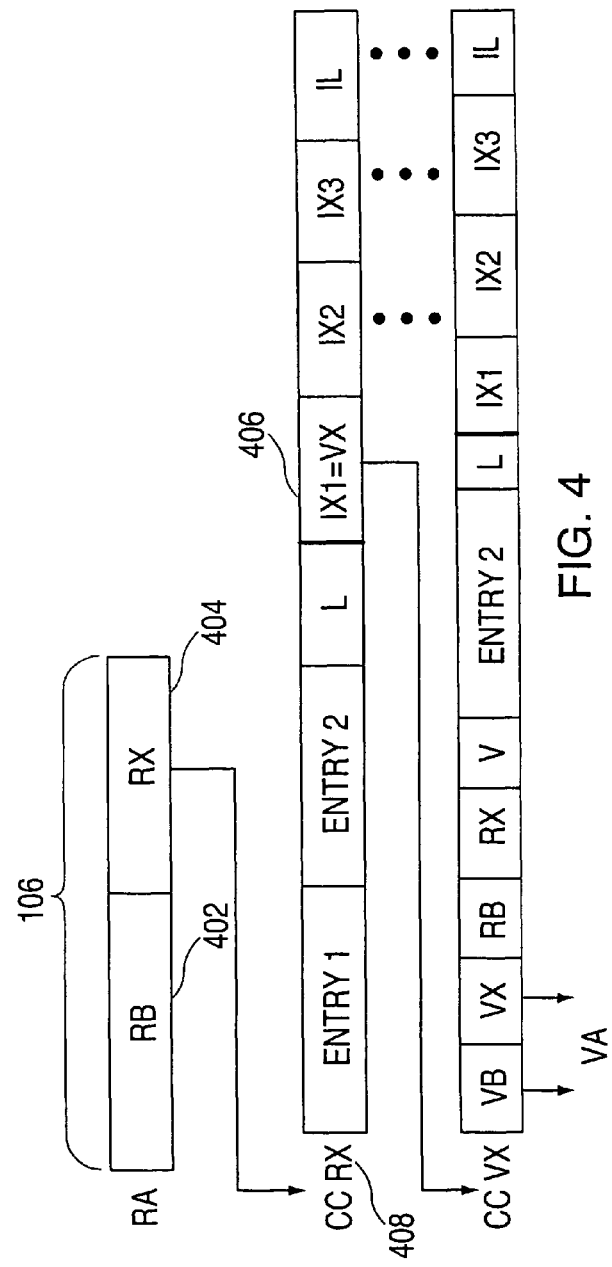

METHOD, SYSTEM, AND COMPUTER PROGRAM PRODUCT FOR IMPLEMENTING A DUAL-ADDRESSABLE CACHE

BACKGROUND OF THE INVENTION

1. Field of the Invention

This invention relates to data cache circuits, and more particularly, to a method, system, and computer program product for implementing a dual-addressable cache.

2. Description of Background

A cache is a high-speed array of recently-accessed data or other computer information and is typically indexed by an address. Certain caches, like translation caches (also known as translation-lookaside buffers (TLBs)), can have two viable indices, such as a virtual address index (before translation) and a real address index (after translation). If such an array is indexed by one type of address (e.g., virtual address), but a search or update is required based on the other type of address (e.g., real address), a linear search of the array is typically required in order to determine any occurrence of the desired address (in this case, the real address).

One solution is a content addressable memory (CAM) array, which refers to a large structure that provides a highly parallel lookup of the non-indexed address type. Unfortunately, CAMs are expensive to build, take up significant amounts of chip area, and usually have significant logic restrictions (e.g., ability to manipulate only a portion of the address) in order to make them practical. An alternative solution is to have two directories (i.e., arrays), each one indexed by one of the two address types, with updates of both arrays required in order to keep them synchronized. However, this solution, by definition, requires double the number of arrays, as well as a great deal of synchronization logic, which may not be practical.

What is needed, therefore, is a more efficient way to implement caches, in terms of ease of operation, as well as time and memory requirements.

SUMMARY OF THE INVENTION

The shortcomings of the prior art are overcome and additional advantages are provided through the provision of an array indexing scheme that utilizes both virtual and real addressing indices and a single directory. The method includes adding fields for indirect indices to each congruence class provided in a cache directory. The cache directory is indexed by primary addresses. In response to a request for a primary address based upon a known secondary address corresponding to the primary address, the method also includes generating an index for the secondary address, and inserting or updating one of the indirect indices into one of the fields for a congruence class relating to the secondary address. The indirect index is assigned a value of a virtual index corresponding to the primary address. The method further includes searching congruence classes of each of the indirect indices for the secondary address.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 1A illustrates a format of an entry for a translation cache utilizing virtual address indexing methods in the prior art;

FIG. 1B illustrates a sample format of a congruence class for multiple entries associated with an index that utilizes virtual address indexing methods in the prior art;

FIG. 1C illustrates a sample format of a translation cache entry identifying an associated virtual index in the prior art;

FIG. 1D illustrates a sample directory of congruence classes utilizing virtual address indexing in the prior art;

FIG. 3 illustrates a modified format of a congruence class for multiple entries in exemplary embodiments;

FIG. 4 is a graphical depiction of the dual-addressable cache architecture and sample implementation in exemplary embodiments.

Figure 2:
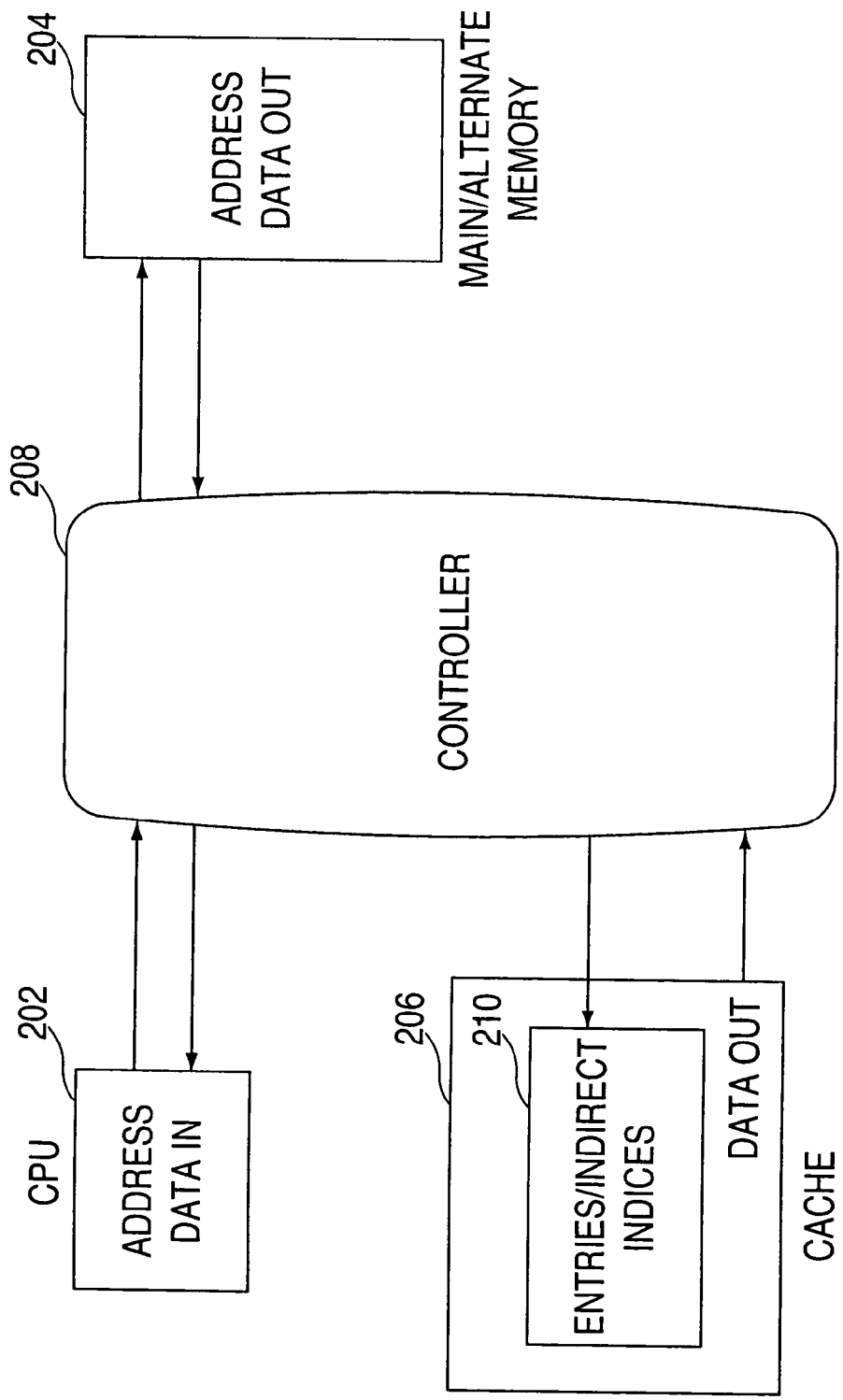
FIG. 2 illustrates a system upon which the dual-addressable cache may be implemented in exemplary embodiments.

The detailed description explains the preferred embodiments of the invention, together with advantages and features, by way of example with reference to the drawings.

DETAILED DESCRIPTION OF THE INVENTION

In accordance with exemplary embodiments, a dual-addressable cache system and method is provided. The dual-addressable cache includes an addressable cache directory in which the entries of the directory have two different addresses, and are indexed by the first (primary) address. In a translation cache, a primary address refers to the nature of indexing utilized and may be either of the virtual address or the real (physical) address. For purposes of illustration, the primary address will be described herein with respect to a virtual addressing index.

In a two-dimensional directory implementation, there is an index identifying the corresponding congruence class (i.e., all entries which map to the same index) and the other dimension represents the associativity (number of entries within each congruence class). Attached to each congruence class is an LRU (least recently used) indicator to track the age of each of the corresponding entries within that congruence class.

Clearly, this type of directory is easily searched by the first, or primary, address, since that is how it is indexed. To enable it to be indexed quickly by the second (secondary) address, a set of indirect indices is added to each congruence class, together with a separate LRU logic indicator (indirect LRU) for managing the age of these indices independently of the age of the regular entries in the congruence class.

When searching the directory by the secondary address, the secondary address is used to produce an index, much like the primary address (if the addresses are similar enough, it could even be exactly the same method). Of course, this won't point to the entries which necessarily have the secondary address. Rather, it will point to entries whose primary address maps to the same index. A set of indirect indices are provided which point to all of the congruence classes that have entries containing secondary addresses with this index. Accordingly, given a secondary address, only a handful of congruence classes in the cache directory need to be examined for entries that may match the secondary address. This is much more efficient than having to search all of the congruence classes (since secondary address doesn't necessarily have anything in common with the primary address), or having to use complicated (and functionally limited) structures like CAM arrays to speed up the secondary address searching. It is also simpler than using a second directory, indexed by secondary address, to fulfill the function. The dual-addressing cache implementation may be utilized for any type of cache system. However, for purposes of illustration, the dual-addressable cache implementation will be described with respect to a translation cache.

Turning now to FIGS. 1A-1D, the formatting of cache components utilized in the prior art will now be described for background purposes. The format of a typical entry 102 of a translation cache is shown in FIG. 1A. The entry 102 includes a virtual address (VA) 104, a real address (RA) 106 that corresponds to the virtual address 104, and a valid bit (V) 108. The valid bit 108 will be set to '1' if, and only if, the entry 102 is valid (e.g., the entry 102 is valid if it is currently in use).

Multiple entries may be associated with a single index for specifying that these entries are related. This association of entries (associativity) is referred to as a congruence class. A sample format for a congruence class is shown in FIG. 1B. The congruence class 110 of FIG. 1B includes two entries 102 and 112 that share the same index. The format of the second entry 112 also includes a virtual address (VA 114), a real address (RA 116), and a valid bit (V 118). The congruence class 110 also includes suitable LRU logic (L) 120 for managing the entries 102, 112 (e.g., a single bit pointing to the LRU entry) so that only the most recently accessed addresses are stored in the directory. Implicit in any cache design is the notion that in order to work effectively, the distribution of addresses amongst the congruence classes should be fairly close to uniform, thus allowing the partitioned nature of the addresses by congruence class to achieve the overall goal of the cache to contain the most recently accessed addresses.

Assume the associated directory, or array, has some number, C, of congruence classes (CCs), numbered CC0, CC1, CC2, . . . , $CC_{c-1}$, which is indexed by VA in some suitable manner. Making C a power of two and choosing the least significant address bits from VA to produce an index from 0 up to c−1 is one method. This index is referred to herein as a virtual index (VX). As shown in FIG. 1C, VA (e.g., VA 104) is then broken up into two components, a virtual base address (VB) 122 and the virtual index VX 124. The corresponding VX 124 does not need to be part of the entry 102 of FIG. 1C, since it is implicit from the congruence class index; however, it is shown here for purposes of illustration and ease in explanation.

Turning now to FIG. 1D, a directory 126 of congruence classes utilizing virtual address indexing is shown. In order to look up a specific virtual address, a corresponding virtual index VX (not shown) is extracted, the congruence class for the VX (CC VX) is looked up (e.g., CC0 110), and both entries 102, 112 are examined in order to determine whether the desired virtual address is in either of them. This process is easily implemented because the directory 126 is utilizing a virtual addressing index scheme. Performing a look up by a particular real address, however, is not as simple. If there is no correlation between virtual addresses and real addresses, the desired address could be present in any entry in the entire directory 126, or perhaps not present at all. The provision of indirect indices resolves this issue.

Two conditions should be met in order to efficiently implement the indirect indices of the dual-addressing cache system. First, the secondary address should be indexable by the same number of congruence classes as the primary address. The more similar the addresses (frequently the case with virtual and real addresses), the easier this is to accomplish, but even if the two addresses are quite dissimilar, the task of assigning addresses to a fixed set of indices in a fairly uniform manner may require some form of hashing or other suitable mechanism. Second, there needs to be more indirect indices per congruence class than there are entries per congruence class. Even as little as one more index is sufficient. While the design can work with the same number of indirect indexes as entries, efficiency is significantly degraded. Essentially, every entry is pointed to by an indirect index, so in order for an entry to exist, there has to be room in its congruence class as well as room in the set of indirect indices that point to it. These elements are described further herein.

Turning now to FIG. 2, a system upon which the dual-addressing cache features may be implemented in exemplary embodiments will now be described. The system of FIG. 2 includes a processor (e.g., central processor unit (CPU)) 202 that executes instructions and manipulates data stored in memory. CPU 202 requests data from a memory device (e.g., main memory) 204 which is in communication with the CPU 202. These requests may be routed through a controller device 208 that manages the requests and transmission of data between CPU 202, memory device 204, and also from a cache (directory) 206 which is also in communication with CPU 202 via controller device 208. Cache 206 comprises storage for frequently accessed data and addresses. Cache 206 also includes a translation cache component 210 comprising entries (that may further be grouped by congruence class) for translating between virtual and real addressing. The translation cache component 210 further includes indirect indices for implementing a dual-addressing method as described further herein.

In order to implement indirect indices, each congruence class (e.g., 110 of FIG. 1B) is extended with additional fields resulting in a modified congruence class 300 as shown in FIG. 3. Using the example provided in FIGS. 1A-1D, three indirect indices are designated (i.e., one more than the associativity of each congruence class). The modified congruence class 300 of FIG. 3 illustrates three indirect indices 302-306. Each indirect index (IX) is a number from 0 to C−1, much like the virtual index described above. The indirect indices are referred to herein as IX1 302, IX2 304, and IX3 306. An LRU logic (IL) 308 is provided for managing the indirect indices 302-306. The LRU logic IL 308 is separate from, and may be a little more sophisticated (as there should be more IXs than entries to manage) than, the logic indicator (e.g., L 120 of FIG. 1B) needed to manage the entries in the modified congruence class 300.

An indirect index allows a directory of the modified congruence class to be quickly searched by an equivalent real index (RX) of a real address. If real addresses are similar in form to virtual addresses, the real indices could use exactly the same extraction as the corresponding VXs, only using the real addresses instead. Otherwise, some mapping from real address to the numbers 0, 1, 2, . . . , C−1 (for spreading the real addresses amongst the different combinations) may be used.

Turning now to FIG. 4, implementation of the dual-addressable cache indexing scheme will now be described. Given an entry with virtual address VA (broken down in to virtual base VB and virtual index VX) a real address RA (e.g., RA 106) is broken down in real base address (RB) 402 and real index (RX) 404, and an indirect index IX (e.g., IX1 302) is inserted into one of the three indirect index fields (e.g., 406) in congruence class RX 408, and the value it takes on is VX. The directory is now ready to be indexed by real address as shown and described in FIGS. 5 and 6.

Figure 5:
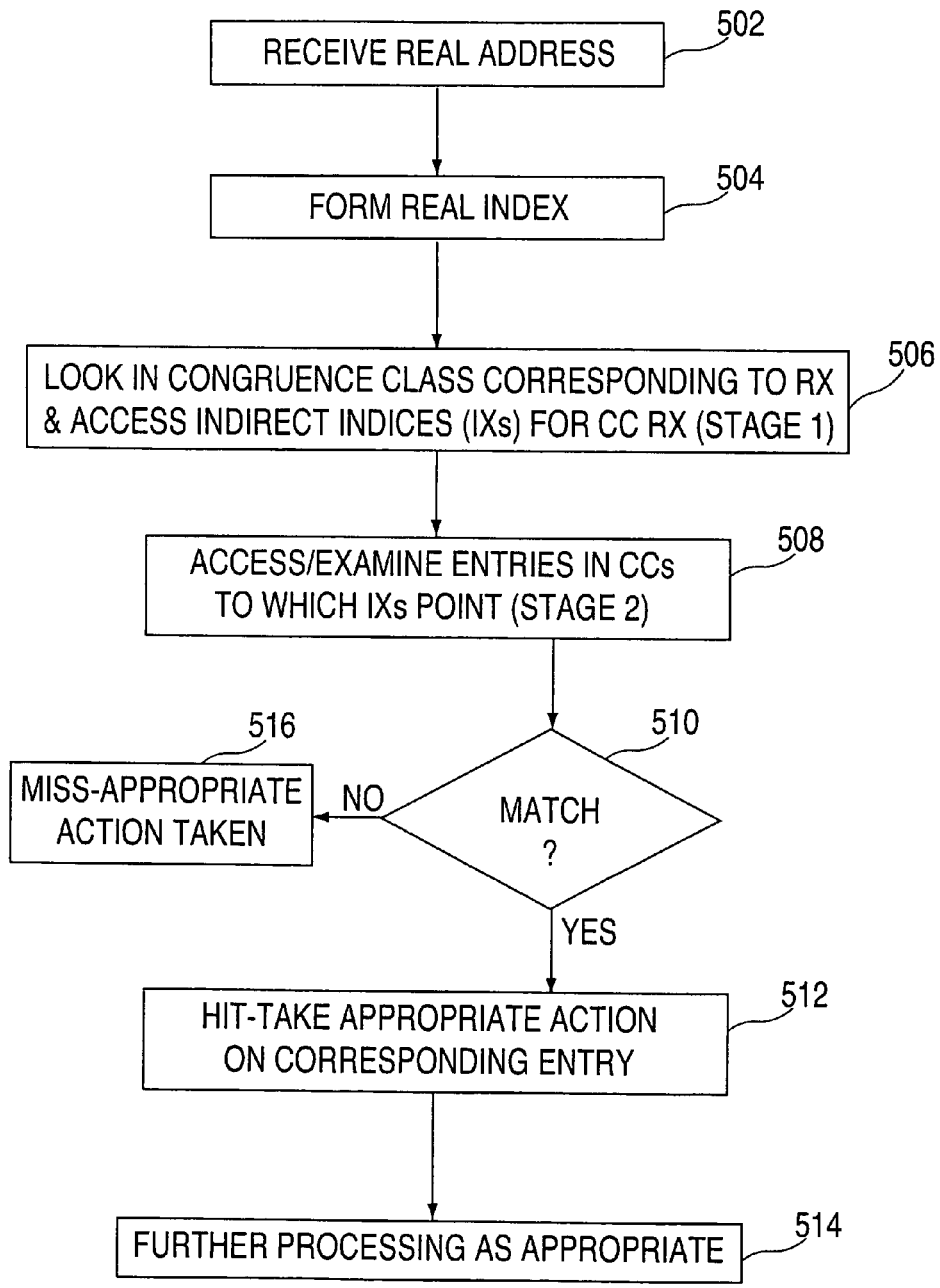
FIGS. 5-6 are flow diagrams describing a process for performing a search, update, and entry utilizing indirect indices in exemplary embodiments.

Turning now to FIG. 5, implementation of a two-stage look-up process utilizing the dual-addressable cache will be described. In step 502, a real address (e.g., RA 106) is provided. A real index is formed for the real address at step 504. The real index may be generated in a similar manner as that described above with respect to the virtual index. At step 506, a congruence class (e.g., 408 of FIG. 4) corresponding to the RX (e.g., 404) is examined. All indirect indices (e.g., 1X1, 1X2, and 1X3) for the congruence class are accessed, followed by accessing the entries in the corresponding congruence classes to which these indirect indices point, in order to determine whether the desired real address 106 matches that of the real addresses in any of these entries at step 508. Clearly, an indirect index might even be a little more specific than a virtual index (e.g., point not only to a congruence class, but also to a specific entry within a congruence class). This is of little concern however because cache directories are usually designed around the notion that a congruence class can be examined very quickly (e.g., in one cycle of a processor time), essentially doing a parallel compare of all of the entries, so having a more specific indirect index doesn't necessarily speed up the ensuing search of the congruence class. Further, by not specifying particular entries in the indirect index, the potential of more than one entry to exist in the congruence with the same real address index value of RX is allowed. This helps make better utilization of the cache directory, especially if there is some correlation between virtual address and real address indexing.

If there is a match at step 510, this indicates that the real address 106 was found in the cache directory. Appropriate action is taken on the corresponding entry (e.g., returning the corresponding virtual address to the requesting processor) at step 512. Further processing (for instance, updating the LRU of the found entry, or searching for more entries should the real addresses not be unique) may be performed at step 514, as appropriate.

If there is no match at step 510, this indicates a miss, i.e., the real address is not in the cache directory. Appropriate action may then be taken at step 516, such as letting the processor know that the real address was not found.

In addition to the standard cache directory maintenance, an LRU update also involves an update of the corresponding indirect index that points to this entry. Given the standard nomenclature used above, finding a virtual address VA=VB and VX produces the corresponding real address RA=RB+RX. Looking up the set of indirect indices in congruence class RX (e.g., 408 of FIG. 4), one of them must be equal to VX. This particular indirect index is made the MRU indirect index in the indirect LRU for this congruence class.

Figure 6:
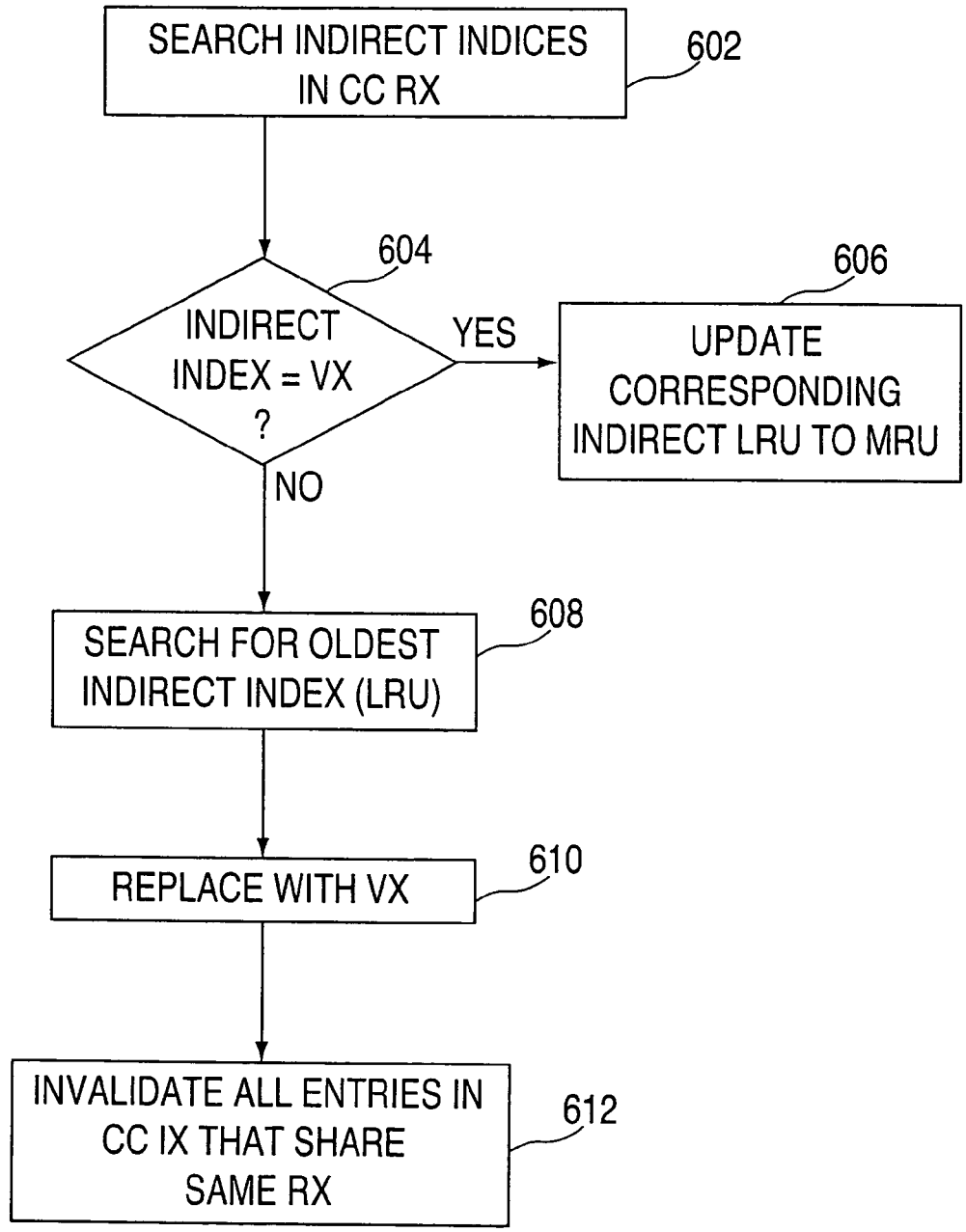

Inserting a new entry entails a little more work to maintain the indirect indices, for a new indirect index usually must be added, which requires deleting a previous one to make room. Turning now to FIG. 6, an insertion process for a new entry will now be described. As part of the normal insertion process, the corresponding set of indirect indices (in congruence class RX) is searched at step 602. If it so happens that there is already an indirect index equal to VX at step 604, the corresponding LRU is updated to make this index the MRU index at step 606. Otherwise, a search is performed to find the oldest (LRU) indirect index at step 608, which is then replaced with VX at step 610, making this the MRU indirect index in the process. However, replacing the LRU indirect index means that any entries pointed to by it (i.e., all entries in all entries in congruence class IX that share the same real index RX) need to be invalidated at step 612, lest there be valid entries in the cache directory that have no corresponding indirect indexes pointing to them.

Suppose, for example, the LRU indirect index has the value IX (different than VX), the entries in congruence class IX need to be looked up, and if any of them have real index RX, they need to be invalidated. Normally, there will be no such entry (i.e., the entry it used to point to has aged out of the congruence class), but in some cases there may be an entry (indicating that its indirect LRU caused it to age out before its regular LRU), which needs to be invalidated. Note that since IX cannot equal VX, this invalidation does not take place in the same congruence class as the regular insertion. Though not likely, there is a possibility of even multiple entries in congruence class IX sharing real index RX. In such a case, each of these entries needs to be invalidated The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A computer program product for searching a dual-addressable cache, the computer program product comprising:
   a non-transitory computer-readable storage device readable by a processing circuit and storing instructions for execution by the processing circuit for performing a method comprising:
   receiving a request to search a cache directory of the dual-addressable cache for a primary address based on a received address corresponding to the primary address, wherein the cache directory comprises congruence classes with multiple cache entries per congruence class, each cache entry comprising a pair of primary and secondary addresses, and each congruence class is indirectly indexed by an indirect index pointing to the secondary address;
   extracting a portion of the received address as an index to a selected congruence class containing a plurality of indirect indexes, the plurality of indirect indexes pointing to the other congruence classes with one or more cache entries containing secondary addresses matching the received address;

accessing the selected congruence class of the cache directory to examine the plurality of indirect indexes;

accessing the other congruence classes of the cache directory pointed to by the plurality of indirect indexes to search for the received address;

responsive to one of the accessed congruence classes having a cache entry with a first address field corresponding to the received address, extracting a second address field from the cache entry as the primary address; and responsive to one of the accessed congruence classes not having the first address field corresponding to the received address, performing a cache miss action;

wherein a first type of address is either a real address or a virtual address, wherein a second type of address is the other of the real address or the virtual address;

responsive to the received address being the first type address, the first address field is the first type address, the primary address is the second type address, and second address field is the second type address, and further wherein the cache entries translating between the virtual address and the real address.

2. The computer program product of claim 1, wherein the received address is a real address, the first address field is a real address field, the primary address is a virtual address, and second address field is a virtual address field, and further wherein the real address is a translation of the virtual address.

3. The computer program product of claim 1, wherein the received address is a virtual address, the first address field is a virtual address field, the primary address is a real address, and second address field is a real address field, and further wherein the virtual address is a translation of the real address.

4. The computer program product of claim 1, wherein the number of indirect indexes included in the plurality of indirect indexes is greater than the number of cache entries in the selected congruence class.

5. The computer program product of claim 1 further comprising computer-readable instructions for searching the congruence classes for additional cache entries upon a determination that the received address is not unique.

6. The computer program product of claim 1 further comprising computer-readable instructions for updating a least recent used status of the cache entry with the first address field corresponding to the received address, once found; and updating an index that points to the cache entry with the first address field corresponding to the received address, the updating of the index including assigning a most recently used status.

7. The computer program product of claim 1 further comprising computer-readable instructions for updating the cache directory by adding an updated cache entry with an updated first address field and an updated second address field in an updated congruence class;

determining a first index value for the updated first address field and a second index value for the updated second address field, wherein the first index value corresponds to the selected congruence class; and inserting the second index value into one of the plurality of indirect indexes of the selected congruence class to establish an indirect index to the updated cache entry.

8. A computer-implemented method for searching a dual-addressable cache, comprising:

receiving a request to search a cache directory of the dual-addressable cache for a primary address based on a received address corresponding to the primary address, wherein the cache directory comprises congruence classes with multiple cache entries per congruence class, each cache entry comprising a pair of primary and secondary addresses, and each congruence class is indirectly indexed by an indirect index pointing to the secondary addresses;

extracting a portion of the received address as an index to a selected congruence class containing a plurality of indirect indexes, the plurality of indirect indexes pointing to other congruence classes with one or more cache entries containing secondary addresses matching the received address;

accessing the selected congruence class of the cache directory to examine the plurality of indirect indexes;

accessing the congruence classes of the cache directory pointed to by the plurality of indirect indexes to search for the received address;

responsive to one of the accessed congruence classes having a cache entry with a first address field corresponding to the received address, extracting a second address field from the cache entry as the primary address; and responsive to one of the accessed congruence classes not having the first address field corresponding to the received address, performing a cache miss action;

wherein a first type of address is either a real address or a virtual address, wherein a second type of address is the other of the real address or the virtual address;

responsive to the received address being the first type address, the first address field is the first type address, the primary address is the second type address, and second address field is the second type address, and further wherein the cache entries translating between the virtual address and the real address.

9. The method of claim 8, wherein the received address is a real address, the first address field is a real address field, the primary address is a virtual address, and second address field is a virtual address field, and further wherein the real address is a translation of the virtual address.

10. The method of claim 8, wherein the received address is a virtual address, the first address field is a virtual address field, the primary address is a real address, and second address field is a real address field, and further wherein the virtual address is a translation of the real address.

11. The method of claim 8, wherein the number of indirect indexes included in the plurality of indirect indexes is greater than the number of cache entries in the selected congruence class.

12. The method of claim 8 further comprising searching the congruence classes for additional cache entries upon a determination that the received address is not unique.

13. The method of claim 8 further comprising:

updating a least recent used status of the cache entry with the first address field corresponding to the received address, once found; and updating an index that points to the cache entry with the first address field corresponding to the received address, the updating of the index including assigning a most recently used status.

14. The method of claim 8 further comprising:

updating the cache directory by adding an updated cache entry with an updated first address field and an updated second address field in an updated congruence class;

determining a first index value for the updated first address field and a second index value for the updated second address field, wherein the first index value corresponds to the selected congruence class; and inserting the second index value into one of the plurality of indirect indexes of the selected congruence class to establish an indirect index to the undated cache entry.

15. A system for searching a plurality of congruence classes of a dual-addressable cache, comprising:
   the dual-addressable cache; and
   a processor capable of accessing the dual-addressable cache, the system capable of performing a method comprising:
      receiving a request to search a cache directory of the dual-addressable cache for a primary address based on a received address corresponding to the primary address, wherein the cache directory comprises congruence classes with multiple cache entries per congruence class, each cache entry comprising a pair of primary and secondary addresses, and each congruence class is indirectly indexed by an indirect index pointing to the secondary address;
      extracting a portion of the received address as an index to a selected congruence class containing a plurality of indirect indexes, the plurality of indirect indexes pointing to other congruence classes with one or more cache entries containing secondary addresses matching the received address;
      accessing the selected congruence class of the cache directory to examine the plurality of indirect indexes;
      accessing the other congruence classes of the cache directory pointed to by the plurality of indirect indexes to search for the received address;
      responsive to one of the accessed congruence class having a cache entry with a first address field corresponding to the received address, extracting a second address field from the cache entry as the primary address; and
      responsive to one of the accessed congruence classes not having the first address field corresponding to the received address, performing a cache miss action;
      wherein a first type of address is either a real address or a virtual address, wherein a second type of address is the other of the real address or the virtual address;
      responsive to the received address being the first type address, the first address field is the first type address, the primary address is the second type address, and second address field is the second type address, and further wherein the cache entries translating between the virtual address and the real address.

16. The system of claim 15, wherein the received address is a real address, the first address field is a real address field, the primary address is a virtual address, and second address field is a virtual address field, and further wherein the real address is a translation of the virtual address.

17. The system of claim 15, wherein the received address is a virtual address, the first address field is a virtual address field, the primary address is a real address, and second address field is a real address field, and further wherein the virtual address is a translation of the real address.

18. The system of claim 15, wherein the system is further capable of performing:
   searching the congruence classes for additional cache entries upon a determination that the received address is not unique.

19. The system of claim 15, wherein the system is further capable of performing:
   updating a least recent used status of the cache entry with the first address field corresponding to the received address, once found; and
   updating an index that points to the cache entry with the first address field corresponding to the received address, the updating of the index including assigning a most recently used status.

20. The system of claim 15, wherein the system is further capable of performing:
   updating the cache directory by adding an updated cache entry with an updated first address field and an updated second address field in an updated congruence class;
   determining a first index value for the updated first address field and a second index value for the updated second address field, wherein the first index value corresponds to the selected congruence class; and
   inserting the second index value into one of the plurality of indirect indexes of the selected congruence class to establish an indirect index to the updated cache entry.

* * * * *